July 25, 1950 P. B. REEVES 2,516,829
SHEET METAL EXPANSIBLE PULLEY
Filed May 5, 1949 2 Sheets-Sheet 1
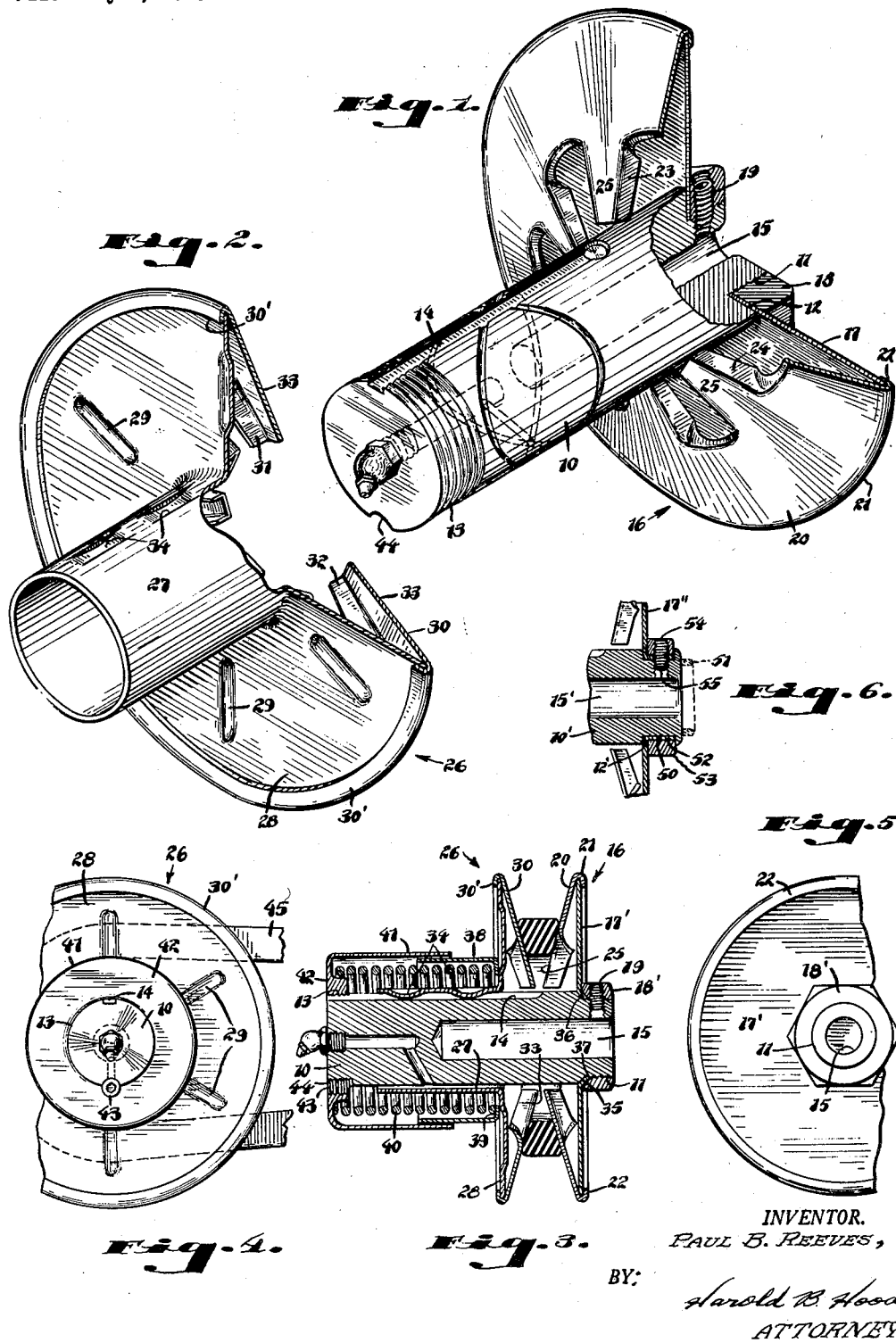
INVENTOR.
PAUL B. REEVES,
BY:
Harold B. Hood.
ATTORNEY.

July 25, 1950 — P. B. REEVES — 2,516,829
SHEET METAL EXPANSIBLE PULLEY
Filed May 5, 1949 — 2 Sheets-Sheet 2
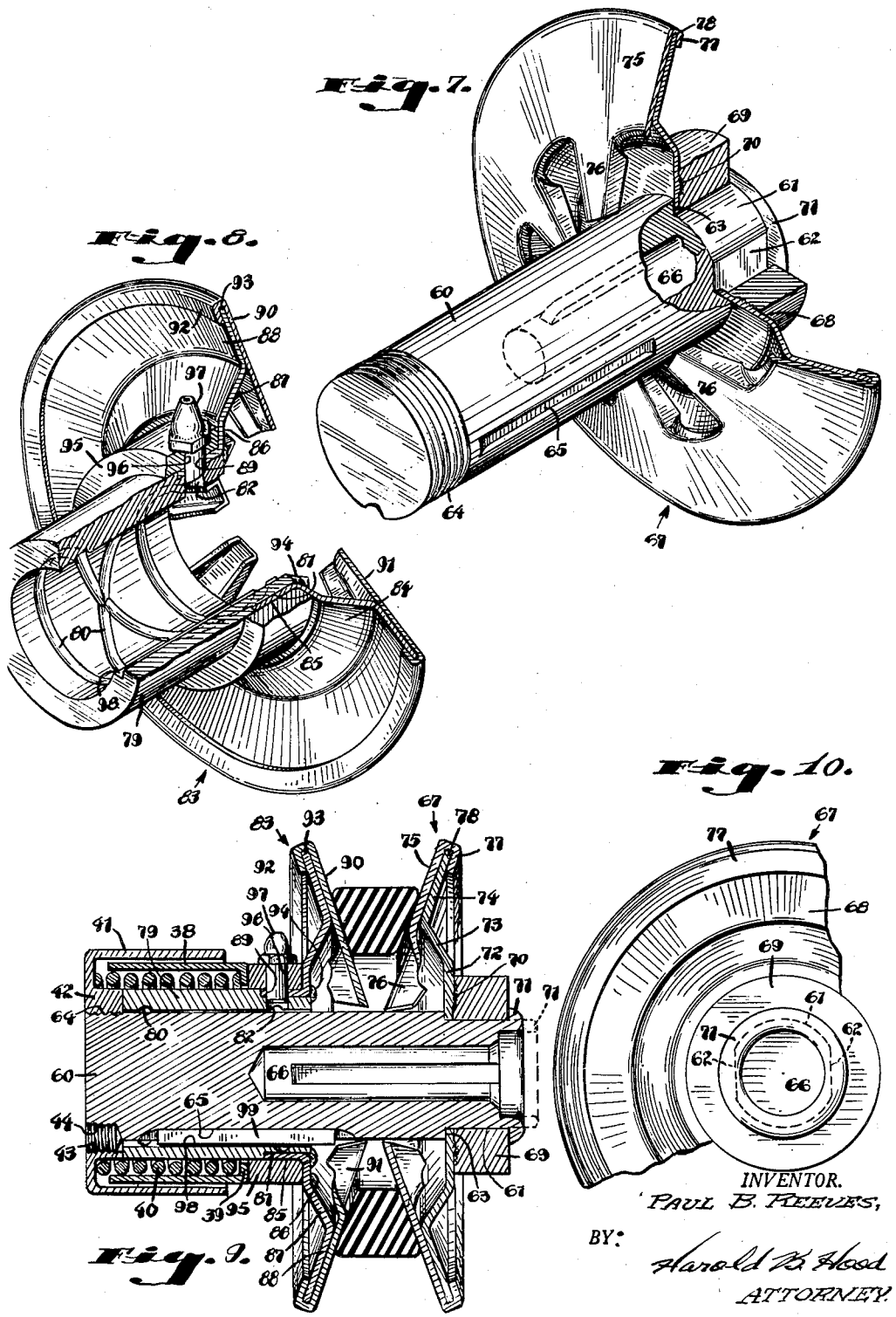
INVENTOR.
PAUL B. REEVES,
BY: Harold B. Hood
ATTORNEY.

Patented July 25, 1950

2,516,829

UNITED STATES PATENT OFFICE 2,516,829

SHEET METAL EXPANSIBLE PULLEY

Paul B. Reeves, Columbus, Ind., assignor to Reeves Pulley Company, Columbus, Ind., a corporation of Indiana Application May 5, 1949, Serial No. 91,615

16 Claims. (Cl. 74—230.17)

The present invention relates to a sheet metal expansible pulley, and is primarily concerned with the production of a sheave of the kind used in variable speed transmission mechanisms of the sort which have come to be known as the "Reeves" type. It is the primary object of this invention to produce a structure, fabricated largely from sheet metal, which can be used effectively to accomplish satisfactorily the functions of the V-pulleys which have always heretofore been made up of cast and subsequently machined coned pulley sections.

This is a continuation-in-part of my copending application Serial Number 659,313, filed April 3, 1946, now abandoned, for "Sheet Metal Expansible Pulley."

Under conditions obtaining at the filing date of my said copending application, the scarcity of castings was an almost insuperable obstacle to the volume production of "Reeves" speed control mechanisms, each of which has always heretofore included a plurality of cast coned discs or pulley sections. Sheet metal was relatively plentiful; but it is not feasible to use any previously-known form of sheet metal construction in the production of pulley sections for use in such speed control mechanism, because pulley sections for such use must possess certain characteristics which are not present in any previously-known sheet metal pulley structures. If even reasonable accuracy of speed control is to be maintained, the pulley sections used in such mechanisms must have sufficient axial strength to resist deformation under relatively heavy axial stresses; and they must, of course, be initially contoured with extreme accuracy. Relative rotational slippage between mating pulley sections must be rigidly prevented. Interdigitation of the apical portions of mating pulley sections is desirable, but rough or sharp edges on the belt-engaging surfaces of the pulley sections should be avoided.

Commercial use of the structures disclosed in said copending application has demonstrated that, for certain applications, sheet metal pulley sections are highly satisfactory, even when castings are readily available; but certain improvements, disclosed for the first time herein, have been devised to increase the desirability of the original concept.

To attain these and other desirable features in a sheet metal, expansible V-pulley, while avoiding those and other undesirable characteristics, constitutes the primary object of this invention. It is further an object of the invention to design a sheet metal pulley meeting the above requirements, while holding the cost of manufacture thereof to a minimum.

Further objects of the invention will appear as the description proceeds.

The invention is illustrated as embodied in a speed control mechanism of the "Vari-speed pulley" type; but it will be understood that many phases of the invention are equally applicable for use in any other environment in which V-pulleys of previously-known construction have been used.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a perspective view, partly in section, of one form of a hub and a fixed pulley section constructed in accordance with my invention;

Fig. 2 is a perspective view, partly in section, of a shiftable pulley section constructed in accordance with my invention, and adapted to be assembled with the parts shown in Fig. 1;

Fig. 3 is a longitudinal sectional view, on a reduced scale, of a speed control unit constructed in accordance with my invention and embodying the pulley sections of Figs. 1 and 2;

Fig. 4 is an end elevation of said unit, viewed from the left of Fig. 3;

Fig. 5 is a similar view taken from the right of Fig. 3;

Fig. 6 is a fragmentary section showing a modified detail;

Fig. 7 is a view similar to Fig. 1 but showing a modified form of fixed sheet metal pulley section differently assembled with the hub;

Fig. 8 is a view similar to Fig. 2 but showing a modified form of shiftable sheet metal pulley section;

Fig. 9 is a view similar to Fig. 3 showing a speed control unit embodying the pulley sections of Figs. 7 and 8; and Fig. 10 is a fragmental end elevation taken from the right of Fig. 9.

Referring more particularly to the form of my invention illustrated in Figs. 1 to 5, it will be seen that I have shown a hub 10 having a reduced threaded end portion 11 providing an outwardly facing shoulder 12. Said hub is threaded at its opposite end, as at 13; and an axially elongated keyway or slot 14 opens through the latter end of said hub. At the former end, said hub is socketed, as at 15, to adapt the same to be fitted onto the end of a machine shaft (not shown).

A sheet metal V-pulley section, indicated generally by the reference numeral 16, is fixedly mounted on the first-mentioned end of said hub. Said pulley section comprises a plane, centrally apertured, sheet metal disc 17 crowded against the shoulder 12 by a nut 18 threaded onto the hub end 11 and held against accidental displacement by a set screw 19. Associated with said disc and forming a part of the pulley section 16 is a coned sheet metal annulus 20, whose apex faces away from the hub end 11 and whose major peripheral portion 21 is clinched about the periphery of the disc 17 as at 22.

The inner peripheral, or apical, portion of the annulus 20 is divided into a series of peripherally spaced, radially extending fingers 25 which converge toward, and substantially into contact with, the hub 10. These fingers must not yield to any appreciable extent under axial pressure; and, by an ingenious expedient, I have contrived to render them axially highly resistant as a necessary result of the method of their production, and without waste of original material or addition of extraneous material. Prior to assembly, a radial slit is formed in each piece 20 on the median line of each space to be defined between the fingers 25, and a peripheral slit is formed to extend from the base of each finger to the base of each adjacent finger. Now the sections 23 and 24 thus released are bent back away from the surface of the piece 20 in the manner clearly to be seen in Fig. 1 to form lateral braces for the fingers 25, while opening the spaces between those fingers. This procedure necessarily results in the production of smooth, rounded surfaces at the peripheral edges of the fingers 25 and at the bases of the intervening spaces, so that wear on the belt running over the coned pulley face will be minimized.

A mating sheet-metal pulley section is indicated generally by the reference numeral 26. This section comprises an elongated sheet metal tubular element 27 provided at one end with an integral, radially extending flange 28. Preferably, but not necessarily, the flange 28 will be stiffened by the provision therein of a peripherally-spaced series of radially elongated deformations 29; and preferably, but not necessarily, the disc 17 will be similarly stiffened.

A cone shaped annulus 30, similar to the annulus 20, is assembled with the flange 28 by clinching its major peripheral portion about the periphery of the flange 28, as at 30'. The inner peripheral portion of the annulus 30 is divided into a series of peripherally spaced, radially extending fingers 33 like the fingers 25 and similarly strengthened by the integral, turned-back sections 31 and 32. Like the fingers 25, the fingers 33 converge toward, and substantially into contact with, the hub 10 when the pulley section 26 is assembled on said hub.

At two axially-aligned points in its length, the tube 27 is radially inwardly deformed, as shown at 34. These inward deformities take an axially sliding fit in the keyway or slot 14 when the pulley section 26 is assembled on the hub; and, the pulley section 16 having been previously properly set on the hub, said deformities will cooperate with the keyway to guide the pulley section 26 into a relationship with the pulley section 16 such that the fingers 33 are staggered with respect to the fingers 25 and will interdigitate therewith as the two pulley sections are brought into ultimate juxtaposition.

In Fig. 3, I have shown a slight modification of structure whereby a maximum variation in effective pulley diameter may be attained without increasing overall pulley diameter, and without sacrificing rotational rigidity between the pulley section 16 and the hub. In place of the radially relatively wide shoulder 12 normal to the axis of the hub, I show a radially short flared section 35 joining the reduced threaded end section 11 with the body of the hub 10. The inner peripheral portion 36 of the disc 17' of the pulley section 16' is similarly flared to lie flatly against the flared section 35, and the adjacent end of the nut 18' is undercut as at 37 to cooperate fully with said flared disc portion. Thus, a wedging action is provided for the nut 18' acting on the disc 17', and an equally effective frictional engagement between the parts is attained although a smaller area thereof is engaged. Thus it is possible to reduce somewhat the diameter of the hub 10, and thereby to increase the effective radial extent of the coned belt engaging faces of the pulley sections without increasing the overall diameters thereof.

After the pulley section 26 is mounted on the hub 10, a cup 38 of sheet metal is sleeved over the tubular extension 27, with its base 39 in engagement with the outer face of the flange 28. Now a coiled spring 40 is sleeved over said tube 27 and is moved into abutment with said cup base 39. A second cup 41, which may be formed of sheet metal, is now brought into the assembly, with its open end telescoping the open end of the cup 38, whereby the spring 40 is entirely enclosed, and with its base forming a confining abutment for the other end of said spring. The base 42 of said cup 41 is formed with a threaded aperture threadedly engageable with the threaded end 13 of hub 10; and when said cup 41 has been properly seated on said hub end, a holding screw 43 may be seated in a threaded socket formed by the cooperation of a tapped groove 44 in the hub end and a corresponding groove in the cup base 42, thereby preventing accidental dislodgment of the cup 41.

It will be seen that thus the spring 40 is enclosed by, and confined between the bases of, the cups 38 and 41 to exert a continuous resilient force upon the pulley section 26 urging the same toward the pulley section 16. That force is resisted by the belt 45 working between the coned faces of the annuli 20 and 30, so long as that belt is tight. Relaxation of the belt, while the pulley is running, will permit the spring 41 to move the pulley section 26 toward the pulley section 16 to crowd the belt outwardly between said sections, thus increasing the effective diameter upon which said belt is working; while an increase in the tension of the belt beyond the predetermined value, will crowd the belt more deeply into the V defined by the faces of said annuli, shifting the pulley section 26 away from the pulley section 16 against the tendency of the spring 41, to reduce the effective pulley diameter upon which the belt is working.

Suitable lubricating means is shown, but since such means forms no part of the present invention, it is not described herein.

As a further alternative, the fixed pulley section may be mounted on the hub in the manner illustrated in Fig. 6. As there shown, the hub 10' may be formed, at that end in which is provided the socket 15', with a reduced extension 50 terminating in an axially-projecting, annular flange 51, as illustrated in dotted lines. The disc 17" corresponding otherwise with the disc 17 of Fig. 1, has its inner peripheral portion 52 turned outwardly to seat on the extension 50; and a collar 53 overlies said disc portion 52, pressing the body of the disc 17" against the hub shoulder 12'. The collar 53 is formed with a tapped radial hole 54 adapted to register with corresponding holes in the disc portion 52 and the hub extension 50, to receive a set screw 55 which, like the screw 19, is adapted to seat upon a shaft entered in the socket 15'.

After the collar 53 has been assembled on the disc portion 52, the flange 54 is spun into its solid-line position, thus crowding the collar 53 against the disc face and the disc against the shoulder 12', and securely holding the disc 17'' in place on the hub 10'.

A modified form of the invention, embodying certain refinements and improvements over the structure thus far described, is illustrated in Figs. 7 to 10 in which I have shown a hub 60 having a reduced end portion 61 which is non-circular in cross section, being provided, in the illustrated embodiment of the invention, with two diametrically opposite flats 62, 62. The reduction of the end portion 61 produces, of course, a shoulder or stop means 63 facing in the direction of said reduced end. The opposite end of the hub 60 is threaded as at 64, and the hub is provided with a longitudinally-extending keyway 65. A socket 66 opens through the reduced end of the hub to adapt said hub for mounting upon a shaft (not shown).

A coned pulley element of sheet metal construction, indicated generally by the reference numeral 67, is fixedly mounted upon that end of the hub at which the reduced section 61 is provided. Said pulley element 67 comprises a backing disc 68 centrally formed with a perforation conforming in contour to the cross-sectional contour of the reduced section 61. Said disc 68 is sleeved on the reduced section 61 of the hub 60 to abut the shoulder 63. The non-circular cross section of the hub section 61, and the conforming contour of the perforation in the disc 68 will, of course, hold said disc against rotation relative to the hub. A ring 69 is sleeved on the hub section 61 to abut that surface of the disc 68 remote from the shoulder 63; and preferably the ring or collar 69 will be spot welded to the disc 68 as indicated at 70. As is most clearly shown in Fig. 9, a portion 71 of the hub 60 projecting beyond the collar 69, may be spun over, after assembly of the parts above enumerated, to overlap the ring 69 to retain said ring and the disc 68 against axial movement relative to the hub 60.

Preferably, the disc 68 will be formed in the manner most clearly illustrated in Fig. 9, to comprise an inner planar section 72, a section 73 inclined outwardly and away from the collar 69, and a radially outermost section 74 inclined outwardly and extending back into the plane of the section 72. This particular conformation provides added stiffness for the disc 68.

A coned annulus 75, whose pitch corresponds to the inclination of the section 74 of the disc 68, is arranged in contact with that face of said disc 68 remote from the collar 69, said annulus being provided with fingers 76 structurally corresponding to the fingers 25 of the annulus 20, above described; and the major periphery 77 of the annulus 75 is clinched about the periphery 78 of the disc 68 to assemble said annulus with said disc.

A sleeve 79, proportioned and designed to have a sliding fit upon the hub 60, is formed on its internal surface with an inwardly-opening lubricant passage 80; and at one end, said sleeve is diametrically reduced, as at 81. The reduced section of the sleeve is formed, at a suitable point, with a radial port 82 communicating with the passage 80.

A second coned pulley element 83 is provided for cooperation with the element 67. The element 83 comprises a disc 84 of sheet metal formed to provide an axially-extending tubular projection 85, which is adapted to be snugly sleeved upon the reduced section 81 of the sleeve 79. It will be seen that the extent of diametrical reduction of the sleeve section 81 is substantially twice the thickness of the material of the tubular projection 85 so that, when said projection is in place on the reduced sleeve portion 81, the external surface of said projection 85 lies substantially flush with the external surface of the unreduced section of the sleeve 79. The disc 84, like the disc 68, will preferably include a central planar portion 86, a portion 87 inclined outwardly and away from the sleeve 79, and a radially outermost portion 88 inclined outwardly and back into the plane of the section 86. The projection 85 is provided with a port 89 which, when the parts are assembled, will register with the port 82.

A coned annulus 90, allochirally related to the annulus 75, is assembled with the disc 84, being provided with fingers 91 similar to the fingers 83, and having its major periphery 92 clinched about the periphery 93 of the disc 84. Preferably, but not necessarily, the disc 84 may be secured to the sleeve 79 by means of silver solder or the like, indicated at 94.

A collar 95 is snugly sleeved upon the sleeve 79 to overlie the projection 85, abutting the section 86 of the disc 84, and spanning said projection and a portion of the unreduced external surface of the sleeve 79, as is most clearly shown in Fig. 9. The collar 95 is provided with a port 96 which, when the parts are assembled, will register with the ports 89 and 82; and preferably a pressure lubricating fitting 97 will be mounted in the port 96 and will preferably extend through the port 89 and into the port 82.

The sleeve 79 is interiorly formed with a keyway 98 in which is engaged a key 99 projecting also into the keyway 65 of the hub 60. Thus, the sleeve 79, with the parts carried thereon, is mounted for reciprocation with respect to, but held against rotational movement relative to, the hub 60.

The pulley element 83 may be continuously urged resiliently toward the pulley element 67 by means of the assembly of parts 38, 39, 40, 41, 42, 43 and 44, as described above in connection with the form of invention illustrated in Figs. 1 to 5; or alternatively, the position of the pulley element 83 relative to the hub may be controlled in any other desired manner. A belt 45 will cooperate with the mating faces of the pulley elements 67 and 83 in the manner in which such belt cooperates with the mating faces 20 and 30 of the organization illustrated in Figs. 1 to 5.

I claim as my invention:

1. An expansible V-pulley comprising a hub formed for attachment to a shaft, a plane, centrally perforated disc of sheet metal fixedly mounted on said hub, a cone-shaped annulus of sheet metal having its major periphery clinched about the periphery of said disc, and having peripherally-spaced, radiating portions of its body bent toward said disc and terminating in free, substantially radially-extending edges facing said disc to define peripherally-spaced fingers pointing toward said hub, a second sheet metal disc centrally formed with an axially-extending tubular projection slidably mounted on said hub, a second cone-shaped annulus of sheet metal having its major periphery clinched about the periphery of said second disc and its conical body in facing relation to said first annulus, said second annulus having peripherally-spaced, radiating portions of its body bent toward said second disc and terminating in free, substantially radially-extending edges facing said second disc to define peripherally-spaced fingers in staggered relation to the fingers of said first annulus for interdigitation therewith and pointing toward said hub, and means for controlling the axial position of said second disc on said hub.

2. An expansible V-pulley comprising a hub formed for attachment to a shaft, a plane, centrally perforated disc of sheet metal fixedly mounted on said hub, a cone-shaped annulus of sheet metal having its major periphery clinched about the periphery of said disc, and having peripherally-spaced, radiating portions of its body bent toward said disc to define peripherally-spaced fingers pointing toward said hub, a second sheet metal disc centrally formed with an axially-extending tubular projection slidably mounted on said hub, a second cone-shaped annulus of sheet metal having its major periphery clinched about the periphery of said second disc and its conical body in facing relation to said first annulus, said second annulus having peripherally-spaced, radiating portions of its body bent toward said second disc to define peripherally-spaced fingers in staggered relation to the fingers of said first annulus for interdigitation therewith and pointing toward said hub, said hub being formed with an axially-extending key slot, said tubular projection being formed, intermediate its ends, with an axially-elongated inward deformation engageable in said key slot, and means for controlling the axial position of said second disc on said hub.

3. An expansible V-pulley comprising a hub formed for attachment to a shaft, a centrally perforated disc of sheet metal fixedly mounted on said hub and lying wholly in a plane normal to the axis of said hub, a cone-shaped annulus of sheet metal having its major periphery clinched about the periphery of said disc to secure said disc and annulus together as a rigid unit, a second sheet metal disc centrally formed with an axially-extending tubular projection slidably mounted on said hub, said second disc lying wholly in a plane normal to the axis of said hub and said projection being extended in a direction away from said first-named disc, a second cone-shaped annulus of sheet metal having its major periphery clinched about the periphery of said second disc to secure said second disc and second annulus together as a rigid unit, said second annulus presenting its conical body in facing relation to said first annulus, and means for shiftably controlling the axial position of said second disc on said hub.

4. An expansible V-pulley comprising a hub formed for attachment to a shaft, a plane, centrally perforated disc of sheet metal fixedly mounted on said hub, a cone-shaped annulus of sheet metal having its major periphery clinched about the periphery of said disc, a second sheet metal disc centrally formed with an axially-extending tubular projection slidably mounted on said hub, a second cone-shaped annulus of sheet metal having its major periphery clinched about the periphery of said second disc and its conical body in facing relation to said first annulus, said hub being formed with an axially-extending key slot, said tubular projection being formed, intermediate its ends, with an axially-elongated deformation engageable in said key slot, and means for shiftably controlling the axial position of said second disc on said hub.

5. An expansible V-pulley comprising a hub formed for attachment to a shaft, a plane, centrally perforated disc of sheet metal fixedly mounted on said hub, a cone-shaped annulus of sheet metal having its major periphery clinched about the periphery of said disc, a second sheet metal disc centrally formed with an axially-extending tubular projection slidably mounted on said hub, a second cone-shaped annulus of sheet metal having its major periphery clinched about the periphery of said second disc and its conical body in facing relation to said first annulus, said hub being formed with an axially-extending key slot, said tubular projection being formed with inwardly-projecting deformations at two axially-separated points intermediate its ends engageable in said slot, and means for controlling the axial position of said second disc on said hub.

6. An expansible V-pulley section comprising a sheet metal tube formed at one end with an integral, radially extending flange lying in a plane normal to the axis of said tube, and a cone-shaped sheet metal annulus disposed on that side of said flange remote from said tube, having its major periphery clinched about the periphery of said flange to secure said flange and annulus together as a rigid unit, said annulus being otherwise bodily spaced axially from said flange and having its apex directed away from said flange and said tube.

7. An expansible V-pulley section comprising a sheet metal tube formed at one end with an integral, radially extending flange, and a cone-shaped sheet metal annulus disposed on that side of said flange remote from said tube, having its major periphery clinched about the periphery of said flange, and having its apex directed away from said flange and said tube, said tube being formed to provide, intermediate its ends, an axially-elongated, radially inwardly projecting deformation.

8. An expansible V-pulley section comprising a sheet metal tube formed at one end with an integral, radially extending flange, and a cone-shaped sheet metal annulus disposed on that side of the flange remote from said tube, having its major periphery clinched about the periphery of said flange, and having its apex directed away from said flange and said tube, said tube being formed, at two axially-separated points intermediate its ends, with radially inwardly projecting deformations.

9. An expansible V-pulley comprising a hub formed for attachment to a shaft, a centrally perforated disc of sheet metal fixedly mounted on said hub, a cone-shaped annulus of sheet metal having its outer peripheral portion turned about the outer periphery of the disc to clamp the outer and inner surfaces of the disc between rebent portions of the annulus periphery to connect said annulus and said disc against relative movement, and having peripherally-spaced, radiating portions of its body bent toward said disc and terminating in free, substantially radially-extending edges facing said disc to define peripherally-spaced fingers pointing toward said hub, a second sheet metal disc centrally formed with an axially-extending tubular projection supported for axial adjustment relative to said hub, means restraining said second disc against rotational movement relative to said hub, a second cone-shaped annulus of sheet metal having its outer peripheral portion turned about the outer periphery of said second disc to clamp the outer and inner surfaces of said second disc between rebent portions of said second annulus periphery to connect said second annulus and said second disc against relative movement, the conical body of said second annulus being disposed in facing relation to said first annulus, said second annulus having peripherally-spaced, radiating portions of its body bent toward said second disc and terminating in free, substantially radially-extending edges facing said second disc to define peripherally-spaced fingers in staggered relation to the fingers of said first annulus for interdigitation therewith and pointing toward said hub, and means for controlling the axial position of said second disc on said hub.

10. An expansible V-pulley comprising a hub formed for attachment to a shaft, a disc of sheet metal provided with a central, non-circular perforation, said disc being sleeved on a section of said hub having a cross-sectional contour corresponding to the contour of such perforation and butted against a shoulder provided on said hub, a collar sleeved on said hub and abutting that surface of said disc remote from said shoulder, a portion of said hub beyond said collar overlapping said collar to retain the same against axial movement relative to said hub, a cone-shaped annulus of sheet metal having its major periphery clinched about the periphery of said disc and its apex pointing away from said collar, a sleeve supported on said hub for axial movement relative thereto but held against rotational movement relative thereto, a second sheet-metal disc fixedly mounted on said sleeve, a second cone-shaped annulus of sheet metal having its major periphery clinched about the periphery of said second disc and its conical body in facing relation to the conical body of said first-named annulus, and means for controlling the axial position of said sleeve on said hub, in which that end of said sleeve adjacent said first-named annulus is reduced in diameter, said second disc is centrally provided with an axially-extending tubular projection snugly sleeved on the reduced-diameter end of said sleeve, and a second collar is mounted on said sleeve to overlie said tubular projection.

11. The pulley of claim 10 in which the diameter of said reduced portion of said sleeve is reduced to an extent substantially equal to twice the thickness of said second disc, whereby the external surface of said tubular projection lies substantially flush with the unreduced portion of said sleeve, and in which said second collar spans at least a part of said tubular projection and at least a part of the unreduced portion of said sleeve.

12. The pulley of claim 11 in which the internal surface of said sleeve is provided with an inwardly-opening lubricant passage and in which said collar, said tubular projection, and said reduced portion of said sleeve are provided with registering ports communicating with said passage.

13. An expansible V-pulley comprising a hub formed for attachment to a shaft, a disc of sheet metal provided with a central, non-circular perforation, said disc being sleeved on a section of said hub having a cross-sectional contour corresponding to the contour of such perforation and butted against a shoulder provided on said hub, a collar sleeved on said hub and abutting that surface of said disc remote from said shoulder, a portion of said hub beyond said collar overlapping said collar to retain the same against axial movement relative to said hub, a cone-shaped annulus of sheet metal having its major periphery clinched about the periphery of said disc and its apex pointing away from said collar, a coned pulley element allochiral with respect to said annulus supported for axial reciprocation relative to said hub toward and away from said annulus in mating relation thereto but held against rotational movement relative thereto, and means for controlling the axial position of said pulley element on said hub.

14. An expansible V-pulley comprising a hub formed for attachment to a shaft, a coned pulley element fixedly mounted on said hub, a sleeve supported on said hub for axial movement relative thereto but held against rotational movement relative thereto, a sheet metal disc fixedly mounted on said sleeve, a cone-shaped annulus of sheet metal having its major periphery clinched about the periphery of said disc with its apex in facing relation to the apex of said pulley element, and means for controlling the axial position of said sleeve on said hub, in which that end of said sleeve adjacent said pulley element is reduced in diameter, said disc is provided with an axially-extending tubular projection snugly sleeved on the reduced end of said sleeve, and a collar is mounted on said sleeve to overlie said tubular projection.

15. An article of manufacture comprising a sleeve, a sheet metal disc having a central, axially-extending tubular projection snugly sleeved on an end of said sleeve, a collar mounted on said sleeve to overlie said projection, and a cone-shaped annulus of sheet metal arranged on that side of said disc remote from said collar and having its major periphery clinched about the periphery of said disc, in which an end of said sleeve is reduced in external diameter by an amount substantially equal to twice the thickness of the material of said tubular projection and in which said projection is sleeved on the reduced portion of said sleeve whereby the external surface of said projection lies substantially flush with the external surface of the unreduced portion of said sleeve, and in which said collar spans at least a part of said extension and at least a part of such unreduced portion of said sleeve.

16. The article of claim 15 in which the internal surface of said sleeve is provided with an inwardly-opening lubricant passage and in which said collar, said tubular projection, and said sleeve are provided with registering ports communicating with said passage.

PAUL B. REEVES.

REFERENCES CITED

The following references are of record in the file of this patent:

UNITED STATES PATENTS

| Number | Name | Date |
|---|---|---|
| 1,118,986 | Williams | Dec. 1, 1914 |
| 1,800,664 | Schultz | Apr. 14, 1931 |
| 1,842,194 | Peterson | Jan. 19, 1932 |
| 2,050,358 | McElroy | Aug. 11, 1936 |
| 2,264,178 | Jensen | Nov. 25, 1941 |

FOREIGN PATENTS

| Number | Country | Date |
|---|---|---|
| 372,849 | Great Britain | May 19, 1932 |